United States Patent [19]

van Loon

[11] Patent Number: 4,656,604
[45] Date of Patent: Apr. 7, 1987

[54] CONTROL CIRCUIT WITH RECOVERY PROTECTION

[75] Inventor: Gerardus M. van Loon, Eindhoven, Netherlands

[73] Assignee: U.S. Philips Corporation, New York, N.Y.

[21] Appl. No.: 571,988

[22] Filed: Jan. 19, 1984

[30] Foreign Application Priority Data

Sep. 14, 1983 [NL] Netherlands ................... 8303167

[51] Int. Cl.⁴ .......................................... G06F 11/28
[52] U.S. Cl. ..................................... 364/900; 371/16; 371/19; 358/903
[58] Field of Search ................. 355/14 CU; 364/200 MS File, 900 MS File, 550, 551, 184–187, 521; 371/12, 13, 16, 19; 358/10, 21 R, 139, 903

[56] References Cited

U.S. PATENT DOCUMENTS

| | | | |
|---|---|---|---|
| 3,838,261 | 9/1974 | Rice et al. | 364/200 X |
| 4,213,190 | 7/1980 | Finlay et al. | 364/900 |
| 4,229,100 | 10/1980 | Travis | 355/14 CU X |
| 4,251,885 | 2/1981 | Dodt et al. | 364/900 X |
| 4,351,050 | 9/1982 | Higashiyama | 371/12 |
| 4,363,092 | 12/1982 | Abo et al. | 364/200 |
| 4,410,938 | 10/1983 | Higashiyama | 364/200 |
| 4,455,652 | 6/1984 | Meulen | 364/184 X |
| 4,507,683 | 3/1985 | Griesshaber et al. | 358/10 X |
| 4,521,847 | 6/1985 | Ziehm et al. | 364/184 |

Primary Examiner—Raulfe B. Zache
Assistant Examiner—Florin Munteanu
Attorney, Agent, or Firm—Thomas A. Briody; Jack Oisher; William J. Streeter

[57] ABSTRACT

A stand-alone functional apparatus comprises a plurality of processing circuits which operate under the control of status data applied by a control circuit and possibly apply status data to the control circuit, more specifically a television receiver with the control circuit in the form of a microcomputer. To protect this microcomputer against external disturbance, a plurality of addressable nonvolatile memory locations are present in which auxiliary status data for at least one processing circuit are stored. A program store comprises a plurality of control programs and also a recovery program. The latter is made operative in response to a disturbance, causing the auxiliary status data to be applied to the relevant processing circuit(s). To enable the determination of a disturbance at least one of the control programs includes a check program.

1 Claim, 7 Drawing Figures

CONTROL CIRCUIT WITH RECOVERY PROTECTION

BACKGROUND OF THE INVENTION

Field of the Invention

The invention relates to a stand-alone functional apparatus for use in consumer products, which comprises a control circuit in the form of a microcomputer, and a non-volatile memory for storing status data.

The term "stand-alone" is to be understood to mean that the functional apparatus can operate independently, without being subordinate to an external device, thus one that does not operate like a peripheral apparatus which is subordinate to a central computer.

Description of the Prior Art

In its generality, a stand-alone functional apparatus comprises a plurality of independent or mutually cooperating processing circuits, whose operation is controlled by the control circuit. They receive status data from the control circuit or apply status data thereto. These status data are indicative of the state in which a processing circuit is or to which state it must adjust itself. In a TV-receiver they represent, for example, the channel or program number the set is tuned to, or tone control, volume, luminance, contrast, etc.

To render it possible to apply the correct status data to the different processing circuits, a plurality of control circuits are coupled to the microcomputer and the microcomputer comprises an internal non-volatile memory having a plurality of addressable memory locations which are each addressable by means of a program counter. Each memory location comprises a given processing stage which is represented by a predetermined code word. A group of mutually associated processing steps is called a control program. The number of such control programs stored in the internal nonvolatile memory differs greatly from apparatus to apparatus.

Although microcomputers are very suitable for use as a control circuit, the mode of operation of the most contemporary microcomputers has been found to be far from reliable when they are used in an environment in which an electromagnetic field is present which may change considerably. Such a situation occurs, for example, in television receivers. As is known, there is a voltage of approximately 25,000 Volts between the anode and the cathode of the picture tube of a TV-receiver. Breakdown phenomena may occur due to contaminations in the picture tube. Such a breakdown phenomenon may be considered to be a current pulse which has a rise time of approximately 5 nanoseconds, a peak value of approximately 220 Amp. and a duration of approximately 100 nanoseconds. Such a current pulse generates voltage pulses everywhere in the TV-receiver and consequently also in the microcomputer. This may result in the microcomputer arriving in an undefined state, because the content of one or more internal registers of the microcomputer such as the program counter, stack pointer, volatile memory, gate registers, etc. has changed and the new contents are not associated with each other. The normal functioning of the microcomputer and consequently also the normal functioning of the functional apparatus is seriously disturbed thereby. With a TV-receiver this usually results in the picture disappearing completely and the microcomputer no longer responding to changes in the states of processing circuits and control circuits, which gives the user the impression that the TV-receiver is defective.

SUMMARY OF THE INVENTION

According to the invention, the apparatus comprises a plurality of addressable nonvolatile memory locations coupled to a control circuit in the form of a microcomputer, the nonvolatile memory locations storing auxiliary status data for at least one processing circuit and an internal nonvolatile memory of the control circuit comprising a recovery program utilizing the auxiliary status data stored in the nonvolatile memory locations to reset processing circuit to a predetermined state, and a check program which forms part of at least one of the control programs in the internal nonvolatile memory and which is used to start the recovery program in the event of a detected error.

If the microcomputer suddenly cycles through a different control program due to a disturbance, then this situation is determined by means of the check program which as a result thereof immediately starts the recovery program. For a a TV-receiver, this recovery program results in the receiver being retuned to either a predetermined channel or program or to the channel or program it was tuned to just prior to the disturbance. Therefore, said channel or program number is stored as an auxiliary status data in the nonvolatile memory locations, optionally together with the contrast setting, luminance setting, etc. associated with that channel or program.

The auxiliary status datum may alternatively be a code word indicating that the receiver is in the stand-by condition. This prevents the receiver from being turned-on due to malfunctioning.

The invention will now be described in greater detail by way of example with reference to a TV-receiver.

DESCRIPTION OF THE PREFERRED EMBODIMENTS

General structure of a TV-receiver

Figure 1:
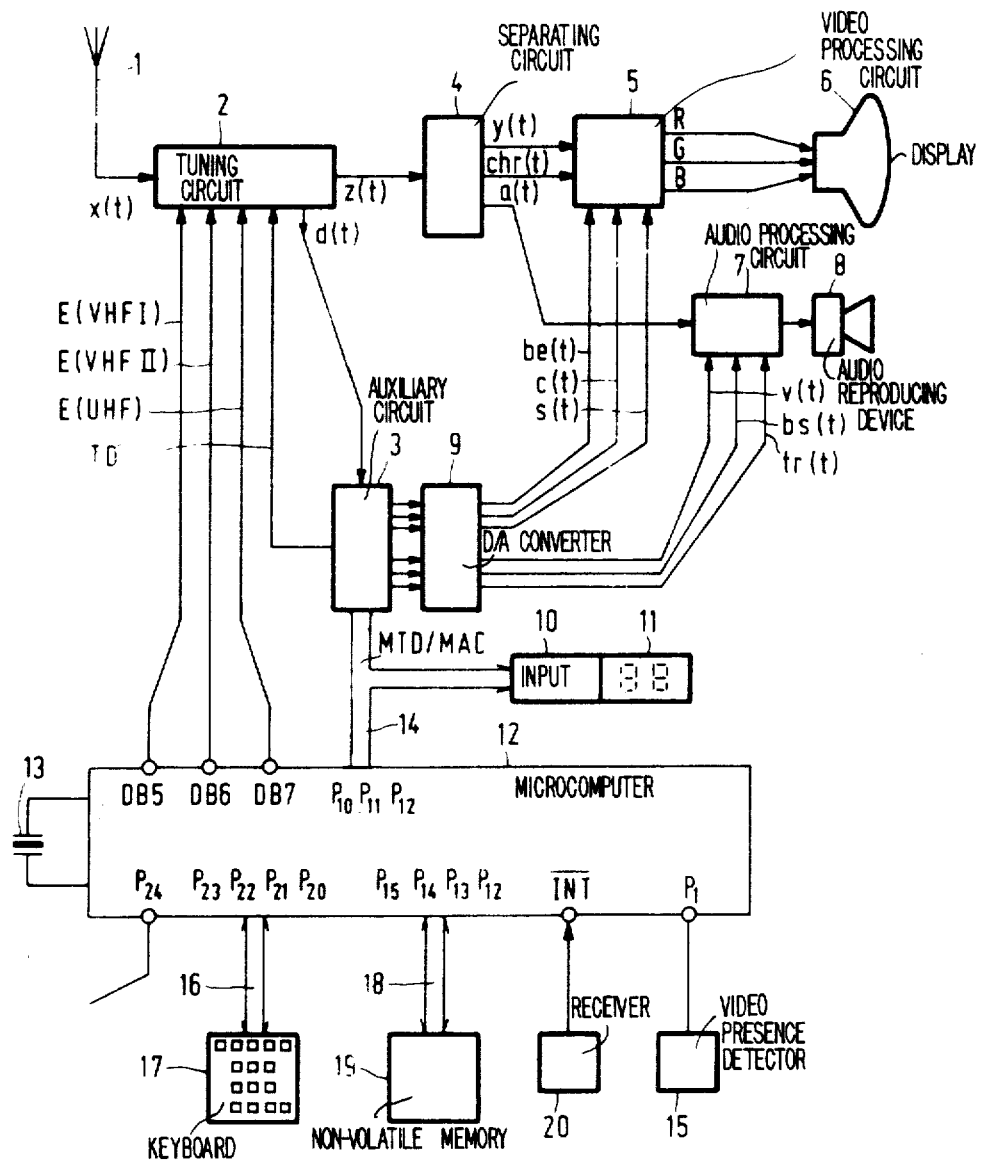
FIG. 1 shows schematically the general structure of a television receiver which comprises a control circuit in the form of a microcomputer.

FIG. 1 shows schematically the general structure of a television receiver. It comprises an aerial 1 for receiving a video signal which is processed in a number of processing circuits. More specifically, the received video signal x(t) is applied to a UHF/VHF-tuning circuit 2, which also receives a frequency band status data E(VHF I), E(VHF II) or E(UHF) to enable tuning of the receiver to a frequency within the respective frequency bands VHF I, VHF II or UHF. This tuning circuit 2 also receives a tuning dataum TD to tune this tuning circuit to the frequency of the desired transmitter in the frequency band chosen. This tuning datum TD is supplied by an auxiliary circuit 3 in response to a tuning status datum MTD applied thereto.

Tuning circuit 2 supplies a demodulated video signal z(t) and an oscillator signal d(t) whose frequency is compared in the auxiliary circuit 3 to a desired frequency which is characterized by the tuning status datum MTD. In addition, the modulated video signal z(t) is applied to a separating circuit 4, which produces the luminance signal y(t), the chrominance signal chr(t) and the audio signal a(t). The signals y(t) and chr(t) are applied to a video processing circuit 5 which produces the three signals R, G and B which are applied to the video display device 6. The audio signal a(t) is applied to an audio reproducing device 8 via an audio processing circuit 7.

For the control of the luminance, contrast, color saturation of the displayed picture and volume, bass and treble of the sound to be reproduced, the video processing circuit 5 receives control signals br(t), c(t) and s(t) and the audio processing circuit 7 receives control signals v(t), bs(t) and tr(t). All these control signals are supplied by the auxiliary circuit 3 in response to a suitably chosen control status datum MAC applied to it. A particularly suitable embodiment of this auxiliary circuit 3 are the Philips types SAB 3034 or SAB 3035. These circuits can supply the said control signals only in the digital form. They are consequently converted into analog control signals with the aid of a digital-to-analog converter 9.

In the TV-receiver shown the tuning status datum MTD is also applied to the input circuit 10 of a digital display device 11 for displaying the channel number or the program number the receiver is tuned to.

The frequency band status data E(.) and also the tuning status datum MTD and the control status datum MAC are produced by a microcomputer 12 which receives clock pulses from a generator 13. Suitable microcomputers are, for example, the Philips types MAB 8048, MAB 8049, MAB 8050, MAB 8400 etc. The following description will be based on the MAB 8049 equivalent to INTEL 8049.

The frequency band-status data E(.) are taken from the three gates DB5, DB6 and DB7. The tuning status data MTD and the control status data MAC are applied via a serial data bus 14 to the auxiliary circuit 3 and to the input circuit 10. This bus 14 is connected to the gates $P_{10}$, $P_{11}$ and $P_{12}$. A signal which indicates whether the TV-receiver is in the switched-on state or not is applied to the microcomputer 12 by means of a gate $P_{24}$, while a video-presence signal which indicates that a video signal is received or not received, is applied to a further gate $P_1$. This video-presence signal is produced by a video-presence detector 15. In addition, a plurality of control circuits are connected to the microcomputer in order to apply predetermined data to this microcomputer. More specifically, a bus 16 which connects the microcomputer 12 to a keyboard 17 is connected to the gates $P_{20}$, $P_{21}$, $P_{22}$, $P_{23}$. In addition, by means of a bus 18 a nonvolatile memory 19 in which, for example, the tuning status data MTD of a number of preselected transmitters are connected to the gates $P_{12}$, $P_{13}$, $P_{14}$ and $P_{15}$. In practice, this nonvolatile memory 19 can be chosen such that it also comprises the nonvolatile memory locations mentioned in the foregoing for storing the auxiliary status data. A third control circuit connected to the microcomputer is the receiver 20 of a remote control system. More specifically, the output of this receiver is connected to the external interrupt input $\overline{INT}$.

TV-receiver operation

Figure 2:
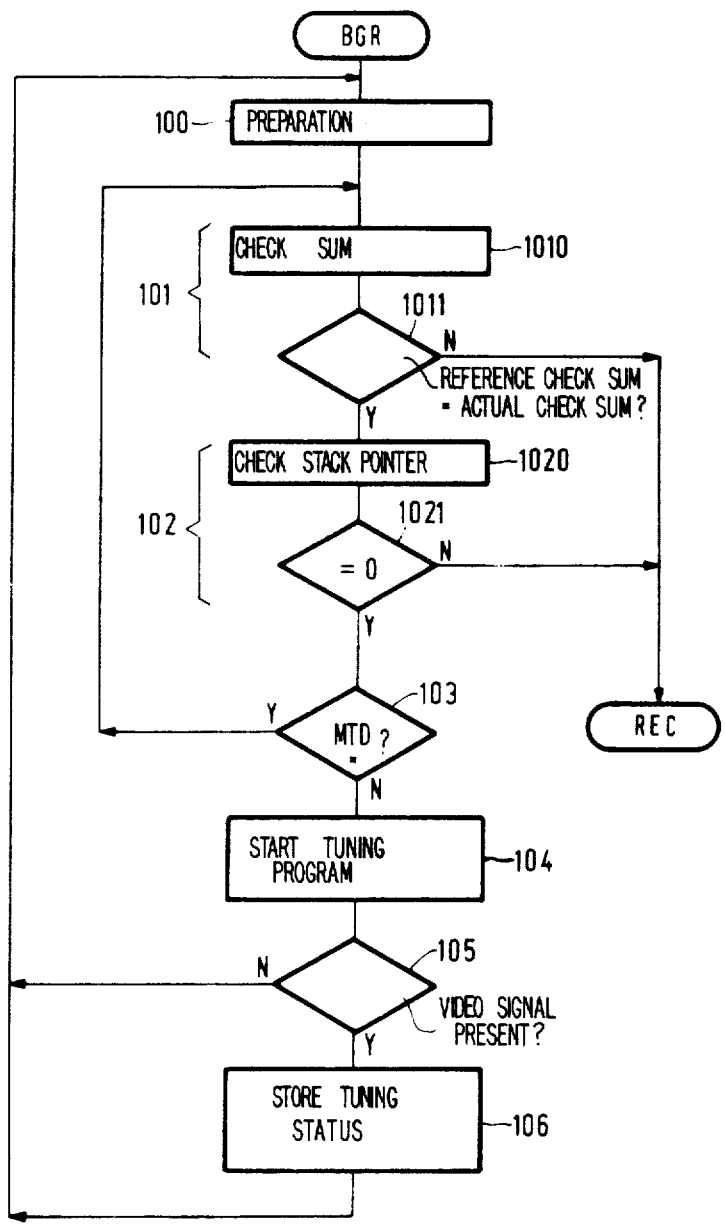
FIGS. 2 to 7 inclusive show some flow charts to explain the operation of the receiver shown in FIG. 1.

As has already been mentioned in the foregoing, the microcomputer provides a nonvolatile internal memory, usually a ROM, in which a plurality of control programs are stored. One of these control programs is the background program BGR which is continuously cycled through. This background program comprises the steps which are schematically shown in FIG. 2 by means of a flow chart. More specifically, this background program comprises a preparation program 100 in which immediately after the receiver has been tuned to the predetermined transmitter the sum is calculated of a number of data present in a number of internal registers of the microcomputer. The number thus obtained is denoted as a reference check sum and is stored in a spare memory location of an auxiliary memory.

To check whether the microcomputer has arrived in an undefined state due to malfunctioning, a number of check programs are first cycled through. In a first check program 101 in a step 1010 an actual value is first determined of the check sum. In a step 1011 this actual check sum is compared to the reference check sum. If both check sums are equal to each other, then a second check program 102 is cycled through, in which in, for example, step 1020 the value of the stack pointer is determined. The value of the stack pointer must be zero. If it is unequal to zero this implies that the microcomputer has been adjusted to an undefined state due to the occurrence of a disturbance and that it was cycling through a subprogram prior to the occurrence of the disturbance. It is therefore checked in step 1021 if this stack pointer has a value equal to zero. If yes, then still further check programs can be cycled through.

After all the check programs have been cycled through it is checked in a step 103 whether the receiver is still tuned to the desired transmitter which is characterized by the tuning status datum MTD. If this is indeed the case, then the sequence of check programs 101, 102 is cycled through again. If it is found that the receiver is not tuned to the desired transmitter, then a tuning program 104 is started. At the end of this program the receiver will then indeed be tuned to the desired transmitter, but it is possible that no picture is displayed. Whether there is a picture is determined in step 105 in which it is checked whether the presence detector 15 indicates the presence of a video signal. If this is not the case then the preparation program 100 is started. If a video signal is indeed present then in a step 106 the actual tuning status datum is stored as an auxiliary status datum in an addressable nonvolatile memory location and thereafter the preparation program 100 is started again. As has already been mentioned in the foregoing this non-volatile memory location is preferably part of the non-volatile memory 19, which may comprise a plurality of further addressable non-volatile memory locations for storing further control status data acting as auxiliary status data and characterizing the actual setting of quantities such as contrast, color saturation, sound volume, etc. of the transmitter, characterized by the actual tuning status datum.

If in step 1011 it is determined that the actual check sum is not equal to the reference check sum, or if it is found in step 1021 that the stack pointer is unequal to zero, then a recovery program REC is started which will be described in greater detail hereinafter with reference to FIG. 7. First it will be described via which further control programs this recovery program can be started.

Figure 3:
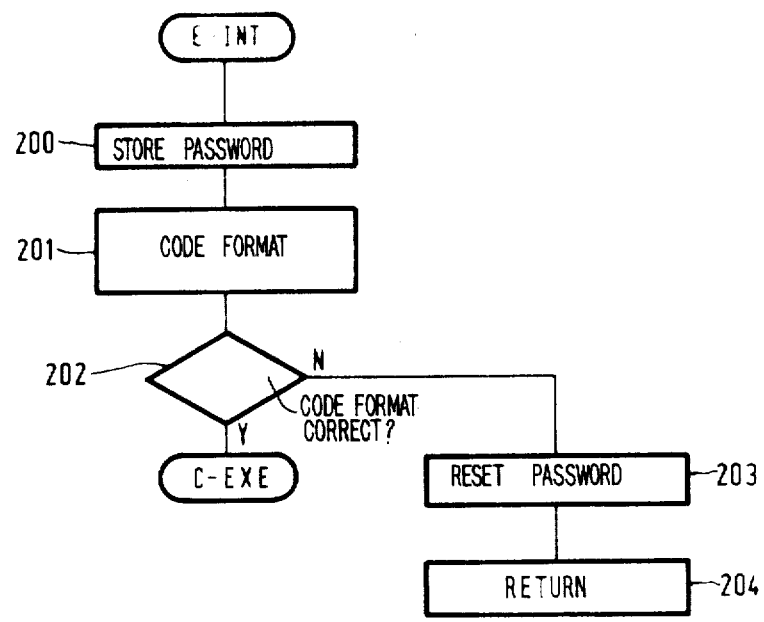

As has already been described in the foregoing, control circuits 17 and 20 are connected to the microcomputer to make it possible to apply predetermined data to the micro-computer. If, more specifically, a control command is applied to the external interrupt input $\overline{INT}$ by the receiver 20 of the remote control system, then the external interrupt program E-INT which is schematically shown in FIG. 3 is started immediately. In order to check that this program is cycled through in response to a disturbance, a first step 200 of a check program is effected. More specifically, in this step 200 a pass word is stored in this step 200 in a memory location of the auxiliary memory. This word indicates that this program is passed through in response to a signal applied by the receiver 20 to the input $\overline{INT}$. Thereafter, in step 201 the code format of this signal is determined and in step 202 it is checked whether this code format is the correct format. When the received signal does not have the correct code format then in step 203 the pass word is reset and in step 204 a return is effected to the control program which was cycled through at the moment at which the interruption occurred. If the received signal does indeed have the correct code format then a command-execute program C-EXE is started which will be described in greater detail hereinafter with reference to FIG. 5.

Figure 4:
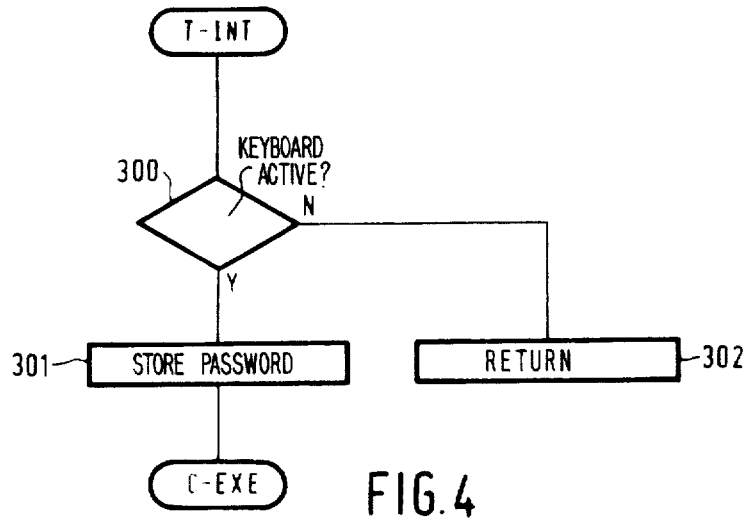

The command-execute program C-EXE can alternatively be started by a what is commonly referred to as a time-interrupt program T-INT which is shown schematically in FIG. 4. This time-interrupt program is started each time after a predetermined time interval of, for example, 20 msec. This time interval is determined by a software counter. This interrupt program has for its object to process data applied to the microcomputer via the keyboard 17. To that end, in a step 300 the keyboard is first scanned in a customary manner by the microcomputer. Each time it is found that a key has been operated, and consequently a control command is transmitted, a first step 301 of a check program is effected. More specifically, in this step 301 a pass word is stored in a memory location of the auxiliary memory, whereafter the command-execute program C-EXE is started. If it is found that no key of the keyboard is operated, then in step 302 a return is effected to the control program which was cycled through at the instant at which the disturbance occurred.

Figure 5:
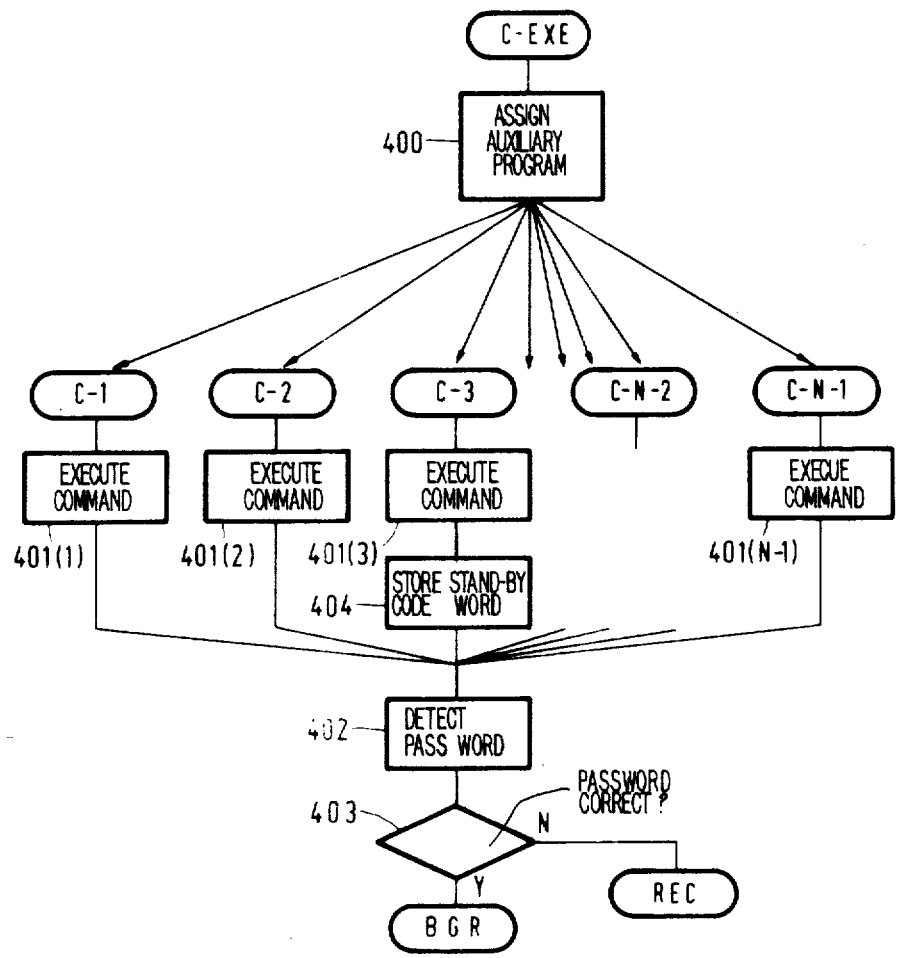

The command-execute program C-EXE which is started after a command has been applied to the microcomputer via the remote control system or by means of the keyboard 17, is shown schematically in FIG. 5. It comprises N auxiliary execute programs C-1, C-2, . . . , C-N-1, one for each control command. Such an auxiliary execute program is activated in customary manner by means of a step 400 in which a predetermined auxiliary execute program is unambiguously assigned to a received control command. After the relevant control command has been effected in a step 401(.) a second step 402 of the control program is effected. In this second step 402 the passage word is checked and in a third step 403 of the control program it is determined whether the pass word is correct. If so, then the background program BGR (FIG. 2) is started. If, however, the pass word is not correct, then the recovery program REC is started.

It should be noted that the auxiliary execute program C-3 is activated when the receiver must be adjusted to the "stand-by" state by means of a button reserved for that purpose. After this command has been effected in step 401(3), in step 404 the last actual tuning status data stored as an auxiliary status datum in a memory location of the nonvolatile memory 19 is replaced by a "stand-by" code word which indicates that the receiver is in the "stand-by" condition and this code word now represents the said auxiliary status datum.

Figure 6:
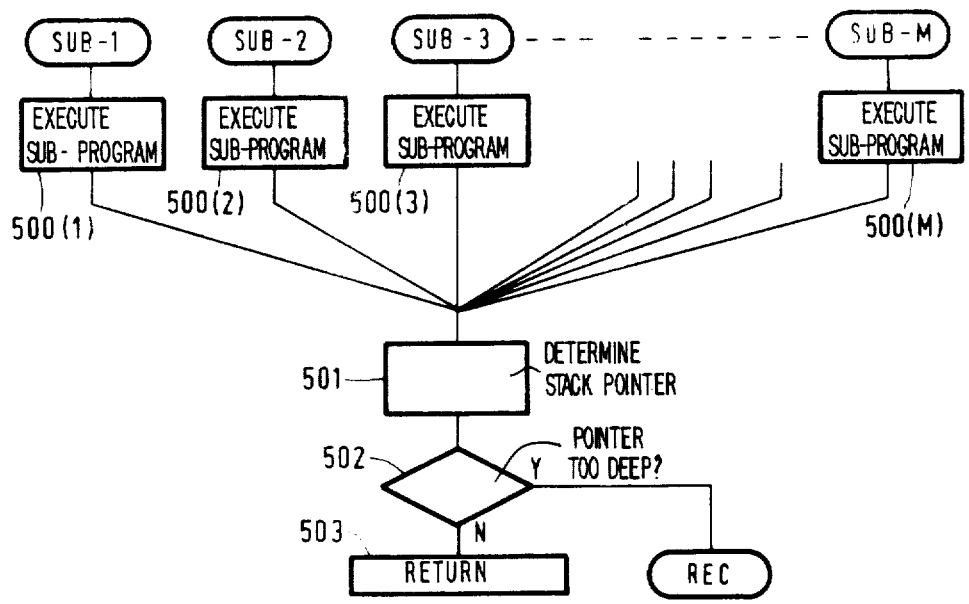

A further possibility to render it possible to determine whether the microcomputer has arrived in an unexpected state due to malfunctioning is shown schematically in FIG. 6 and relates to the passing through of subprograms. Each time such a subprogram 500(.) has been passed through, a check program is effected consisting of a step 501 and a step 500. More specifically, in step 501 the depth of the stack pointer is determined. Thereafter it is checked in step 502 whether the depth is too deep. If not, then in step 503 a return is made to the control program which was passed through at the instant at which the relevant subprogram was activated. If the stack pointer is found to be too deep then the recovery program REC is started.

Figure 7:
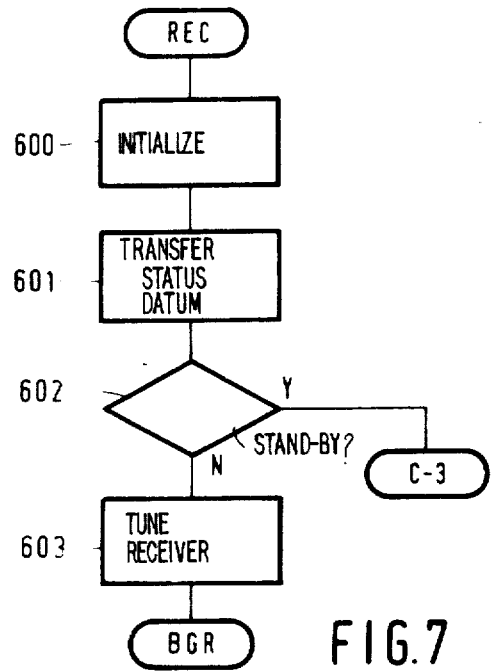

The said recovery program REC has a structure which is schematically shown in FIG. 7. It comprises an initializing step 600. Therein all the steps are effected which are also effected on switch-on of the receiver and the microcomputer receives via gate $P_{24}$ a signal which is characteristic of an energized receiver. More specifically, in this initialization step all gates are inter alia reset, the auxiliary memory is erased, the software counter is stopped, any interrupts received via input $\overline{INT}$ are made inoperative, and in addition the status register, the stack pointer and the stack register are reset. Thereafter, in step 601 the auxiliary status datum stored in the nonvolatile memory 19 is conveyed to the auxiliary memory. Thereafter, in step 602 is determined what this auxiliary status datum represents. If it is the "stand-by" code word then the "stand-by" command execute program C-3 (see FIG. 5) is effected. If the auxiliary status datum represents a tuning status datum then in step 603 the receiver is tuned to the transmitter characterized thereby, whereafter the microcomputer proceeds to cycling through of the background program BGR.

What is claimed is:

1. In a television receiver, having a plurality of signal processing circuits responsive to control signals and having a non-volatile memory for storing reference data representative of the actual status of said receiver, a microcomputer control circuit coupled to said signal processing circuits and to said non-volatile memory and said microcomputer control circuit generating for each signal processing circuit a control signal representing control data, said microcomputer operating under the control of a plurality of control programs, each control program including a check subprogram for recognizing the allowability of the actual execution of that control program, a recovery program which is executed in response to the recognition of a non-allowable execution of the control program and in which said reference data is evaluated for producing allowable control data.

* * * * *